UNITED STATES PATENT OFFICE.

SYLVESTER ZUCKSCHWERDT, OF LEOPOLDSHALL, GERMANY.

PROCESS OF PRODUCING CYANATE OF POTASSIUM.

SPECIFICATION forming part of Letters Patent No. 709,570, dated September 23, 1902.

Application filed June 4, 1900. Serial No. 19,029. (No specimens.)

*To all whom it may concern:*

Be it known that I, SYLVESTER ZUCKSCHWERDT, a subject of the Emperor of Germany, and a resident of Leopoldshall, Duchy of Anhalt, Germany, have invented certain new and useful Improvements in Processes for the Production of Cyanate of Potassium, of which the following is a specification.

The present invention provides a commercially-advantageous process for the production of cyanate of potassium.

The production of cyanate of potassium in a marketable form as heretofore carried out presents many difficulties to the manufacturer and cannot be effected without considerable outlay. (See Slego Erdmann, *Berichte der Deutschen Chemischen Gesellschaft*, XXVI, 1893, p. 2438.)

The object of the present invention is to provide means by which cyanate of potassium can be readily and cheaply obtained. In a number of manufactures cyanogen salt is formed as a by-product and has hitherto been wasted, as no means were known by which it could be separated in a practically advantageous manner. For example, in the treatment of the lyes obtained by the synthetic cyanogen process a salt mixture is obtained as a by-product, which along with considerable quantities of cyanate of potassium contains cyanid of potassium and carbonate of potash in varying quantities. The cyanate of potassium contained in this mixture has hitherto been lost because no means were known for separating it from the mixture.

By the present invention cyanate of potassium is obtained from the said by-product, the said salt being in a marketable form and very much cheaper than can be obtained by the ordinary processes.

According to this invention the refuse-salt mixture is made into a mash with water at a temperature not exceeding 66° centigrade. At this temperature and by suitably limiting the addition of water the potash chiefly becomes dissolved and the cyanate and cyanid of potassium are but slightly affected and remain for the greater part in the solid form and almost free from potash. This mixture of cyanate of potash and cyanid of potassium is then made into a mash with a limited quantity of water at a very low temperature, which must not be lower than minus eighteen ($-18$) or higher than plus five ($+5$) degrees centigrade. At this temperature the cyanid of potassium is chiefly dissolved along with the remainder of the potash, but only a very small proportion of the cyanate. The addition of water can then be regulated in such a manner that the whole of the cyanid of potassium is dissolved out of the salt mixture, and the residue thus obtained consists of pure cyanate of potash in a marketable form. In removing the potash and the cyanid of potash as much water is to be added until a centrifugated sample contains only small quantities of potash and cyanid of potash, respectively. The process consequently affords the additional advantage from a manufacturing point of view that all the refuse lyes resulting from this fractional lixiviating process are in a highly-concentrated form and admit of being used over again without any waste of potash or of cyanid of potassium. The cyanate of potassium thus obtained can, owing to its low cost and purity, be advantageously and economically employed for conversion into other cyanogen salts or into urea and other allied preparations.

I claim—

The process herein described for the separation of cyanate of potassium from cyanid and carbonate, thereby producing pure cyanate of potassium, which consists in first treating the salt mixture obtained from the synthetic cyanogen processes, with sufficient water to dissolve the carbonate and at a temperature not over 66° centigrade, whereby the cyanid and cyanate remain undissolved, and then treating the said remaining undissolved salt mixture with sufficient water to dissolve the cyanid and at a temperature not exceeding 5° centigrade, whereby the cyanate remains undissolved.

In testimony whereof I have signed my name to this specification in the presence of two subscribing witnesses.

SYLVESTER ZUCKSCHWERDT.

Witnesses:
HEINRICH GÖRIG,
MAX LOESCHE.